United States Patent [19]
Yeh et al.

[11] Patent Number: 5,557,523
[45] Date of Patent: Sep. 17, 1996

[54] REAL-TIME SIMULATION FOR TESTING AN ABS CONTROLLER

[75] Inventors: Edge C. Yeh, Hsinchu; J. H. Ton; G. K. Roan, both of Tao-Yuan, all of Taiwan

[73] Assignee: National Science Council, Taiwan

[21] Appl. No.: 216,934

[22] Filed: Mar. 21, 1994

[51] Int. Cl.$^6$ ................................................ G01L 5/28
[52] U.S. Cl. ........................ 364/424.03; 364/426.02; 73/121
[58] Field of Search ................... 364/426.01, 424.03, 364/424.04, 426.02; 73/121, 117.1, 123, 129, 132, 118.1, 126; 303/92

[56] References Cited

U.S. PATENT DOCUMENTS

| | | | |
|---|---|---|---|
| 4,192,180 | 3/1980 | Gerstenmeier et al. | 73/121 |
| 4,340,935 | 7/1982 | Anlauf et al. | 73/121 |
| 4,709,223 | 11/1987 | Crapanzano | 73/121 |
| 4,719,796 | 1/1988 | Zenker | 73/121 |
| 4,771,387 | 9/1988 | Hexel et al. | 364/426.01 |
| 4,831,868 | 5/1989 | Makino | 73/126 |
| 4,986,114 | 1/1991 | Rothmann et al. | 73/126 |
| 5,005,405 | 4/1991 | Ishizeki | 73/123 |
| 5,339,682 | 8/1994 | Watanabe et al. | 73/123 |

*Primary Examiner*—Gary Chin
*Attorney, Agent, or Firm*—Michael D. Bednarek; Kilpatrick & Cody

[57] ABSTRACT

A real-time simulation system for testing an ABS controller. The simulation system receives car dynamic data from a computer and transmits the car dynamic data to the ABS controller through a controller conversion circuit. The simulation system then receives control signals from the ABS controller and feeds the control signals back to the computer through the controller conversion circuit so as to calculate, analyze, and display results on the monitor of the computer. The simulation system includes a timer circuit used for timing control of real-time calculation; a valve signal output circuit coupled to the controller conversion circuit, for outputting control signals coming from the ABS controller to the computer; a digital-to-analog conversion circuit coupled to the control circuit and the controller conversion circuit, for simulating the car dynamics to compute the wheel speed signals and sending the computed signals to the ABS controller; and a control circuit coupled respectively to the computer, the timer circuit, the valve signal output circuit, and the digital-to-analog conversion circuit, for receiving car dynamic data from the computer, transmitting the car dynamic data to the ABS controller, receiving time value from the timer circuit and control signals coming from the ABS controller, and transmitting the time value and the control signals to the computer for calculating, analyzing and displaying the results.

1 Claim, 12 Drawing Sheets

REAL-TIME SIMULATION FOR TESTING AN ABS CONTROLLER

BACKGROUND OF THE INVENTION

This invention relates to a real-time simulation system for testing controllers of Anti-Skid Brake Systems (hereinafter referred to as ABS), and in particular to a real-time simulator capable of simulating a moving car by employing a personal computer which sends a set of car dynamic data to the ABS controller which in return feeds control signals back to the personal computer. The personal computer calculates and analyses the control signals and displays the results on its monitor.

Most car drivers believe that they can fully stop a car in a short distance if they fully depress the brake-pedal. However, many experiments have shown that, although fully depressing the brake-pedal applies a large braking torque to the car wheels, large braking torque can cause the car wheels to lock. This locking of the car wheels inevitably causes skidding of the tires and spinning of the car and the subsequent loss of control which often results in accidents.

While the car wheels skid on the road and spinning of the car occurs when the wheels are locked during braking if the car wheels continue to roll on the road during braking with slip ratio around 0.1 to 0.3, quasi static friction occurs between the car wheels and the road. This is due to the fact that the point of the car wheel which contacts the ground stays still relative to the ground at the instant of contact. In other words, the car wheels continue to roll (rather than skid) during braking. As people skilled in this art know, dynamic friction coefficients are smaller than static friction coefficients. Thus, keeping the wheels of a car rolling during braking will result in larger frictional forces between the car wheels and the road. Furthermore, if car wheels keep rolling during braking, the car tends to move in the direction of the rolling wheels, and the driver is thus capable of maintaining control of the car in his/her own way during braking. However, if the car wheels lock during braking, the wheels will slip and the car will not have as strong a tendency to continue in the original direction of the wheels. Thus, the car will spin out of control. Therefore, more and more cars are equipped with ABS which are provided with sensors for sensing tire speeds and inputting the speed data into a CPU installed within the system so as to assist the driver in preserving braking control.

There are presently many patents relating to this kind of simulator, for example, U.S. Pat. Nos. 4,831,868, 4,893,242, 4,926,683, and 4,986,114. Among the above-described patents, the '868 patent proposes to employ a tester coupled to an ABS controller. The tester outputs a command actuating the ABS controller to work in a testing mode and tests the ABS controller by transmitting signals between the ABS controller and the tester. The '242 patent proposes a method in which car wheels are driven to accelerate to a certain constant speed by a motor, then the brake-pedal is depressed linearly so as to measure the brake torques imposed on each car wheel. The '683 patent proposes to check whether each wheel sensor outputs signals normally or not when the speed of the car wheels are kept at the minimum speed controlled by a controller. If one of the car wheels fails to output signals, a warning lamp will keep glowing. The '114 patent proposes a method in which car wheels are driven to accelerate by a drive roller so as to simulate the dynamic properties of a brake system on different roads.

The above-described systems are either too complicated in actual operation or cannot produce precise results. When maintenance of a controller is necessary, only some simple diagnostic devices are provided by manufacturers for maintaining their own controllers. These devices are merely employed to read error-condition codes from the controllers so as to determine how to maintain the controller. For training in the principles of braking systems, a testing device provided with a brake mechanism is ordinarily employed. The comparison between an ABS and a conventional brake system can be illustrated through the testing device, and some particular situations can also be simulated through the testing device. However, the principles of an ABS cannot be illustrated by utilizing the above testing device.

SUMMARY OF THE INVENTION

The object of this invention is to provide a real-time simulation system for testing an ABS controller which receives car dynamic data from a computer by way of a controller conversion circuit and feeds control signals back to the computer for calculating and analyzing. The results of the calculation and analysis are displayed on the monitor of the computer.

The real-time simulation system according to the present invention includes: a timer circuit for outputting time pulses; a valve signal output circuit coupled to the controller conversion circuit for outputting control signals coming from the ABS controller; a control circuit coupled respectively to the computer, the timer circuit, and the valve signal output circuit, for receiving car dynamic data from the computer, transmitting the car dynamic data to the ABS controller, receiving time pulses coming from the timer circuit and control signals coming from the ABS controller, and transmitting the time pulses and the control signals to the computer for calculating and analyzing the time pulses and the control signals and showing the results; and a digital-to-analog conversion circuit coupled to the control circuit and the controller conversion circuit, for converting car dynamic data coming from the control circuit and sending it to the ABS controller.

BRIEF DESCRIPTION OF THE DRAWINGS

In order to clearly elucidate the nature of this invention, a detailed description of a preferred embodiment will be made below with accompanying drawings, wherein.

DETAILED DESCRIPTION OF THE PREFERRED EMBODIMENT

Figure 1:
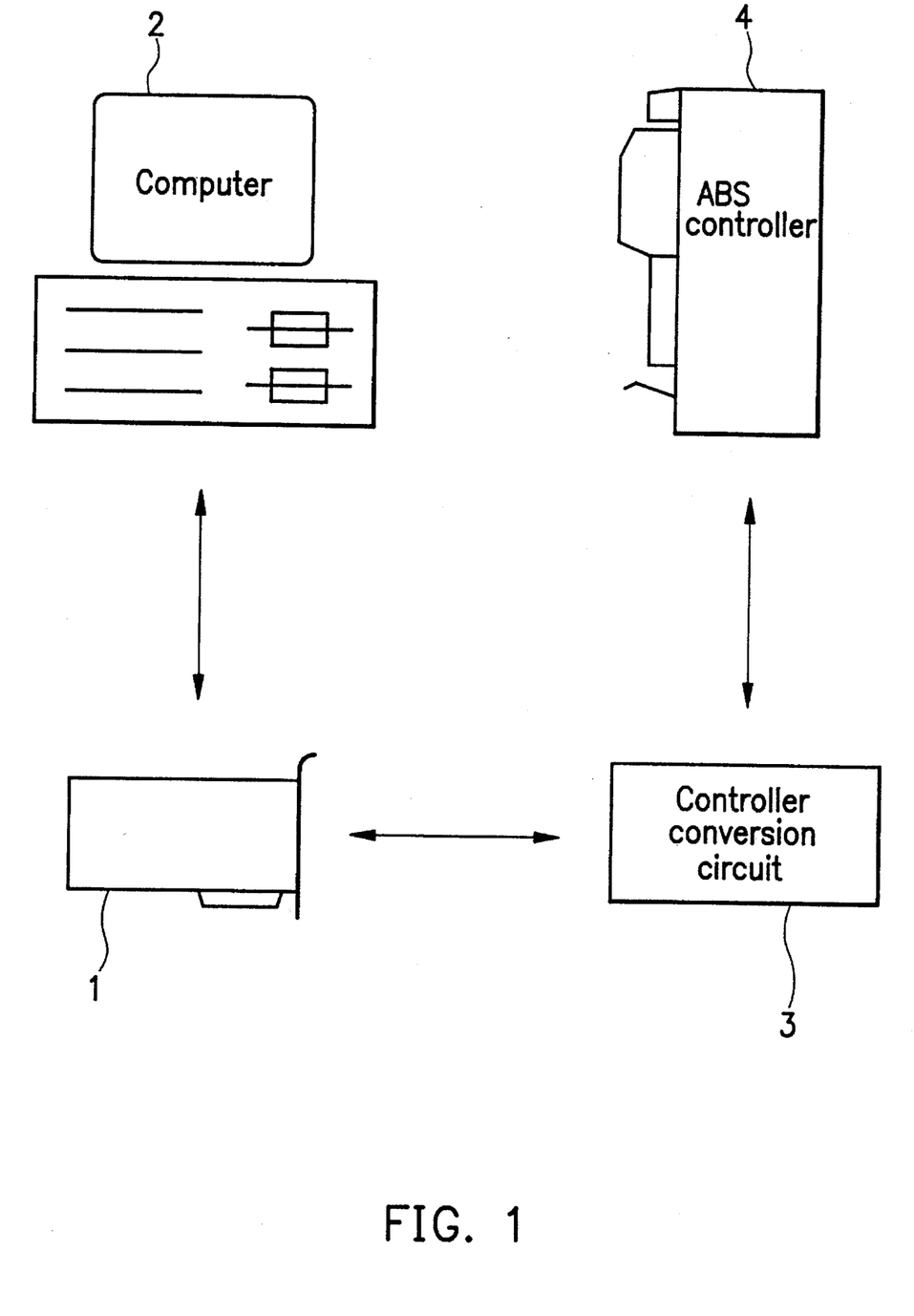
FIG. 1 is a schematic diagram showing the construction of the real-time simulation system according to this invention.

As shown in FIG. 1, the simulation system 1 according to this invention receives car dynamic data from a computer 2 (for example, a personal computer) and sends the data to an ABS controller 4 by way of a controller conversion circuit 3. After receiving car dynamic data, the ABS controller 4 transmits control signals to the computer 2 by way of the controller conversion circuit 3 which performs calculations and analysis and displays the results on its monitor.

Figure 2:
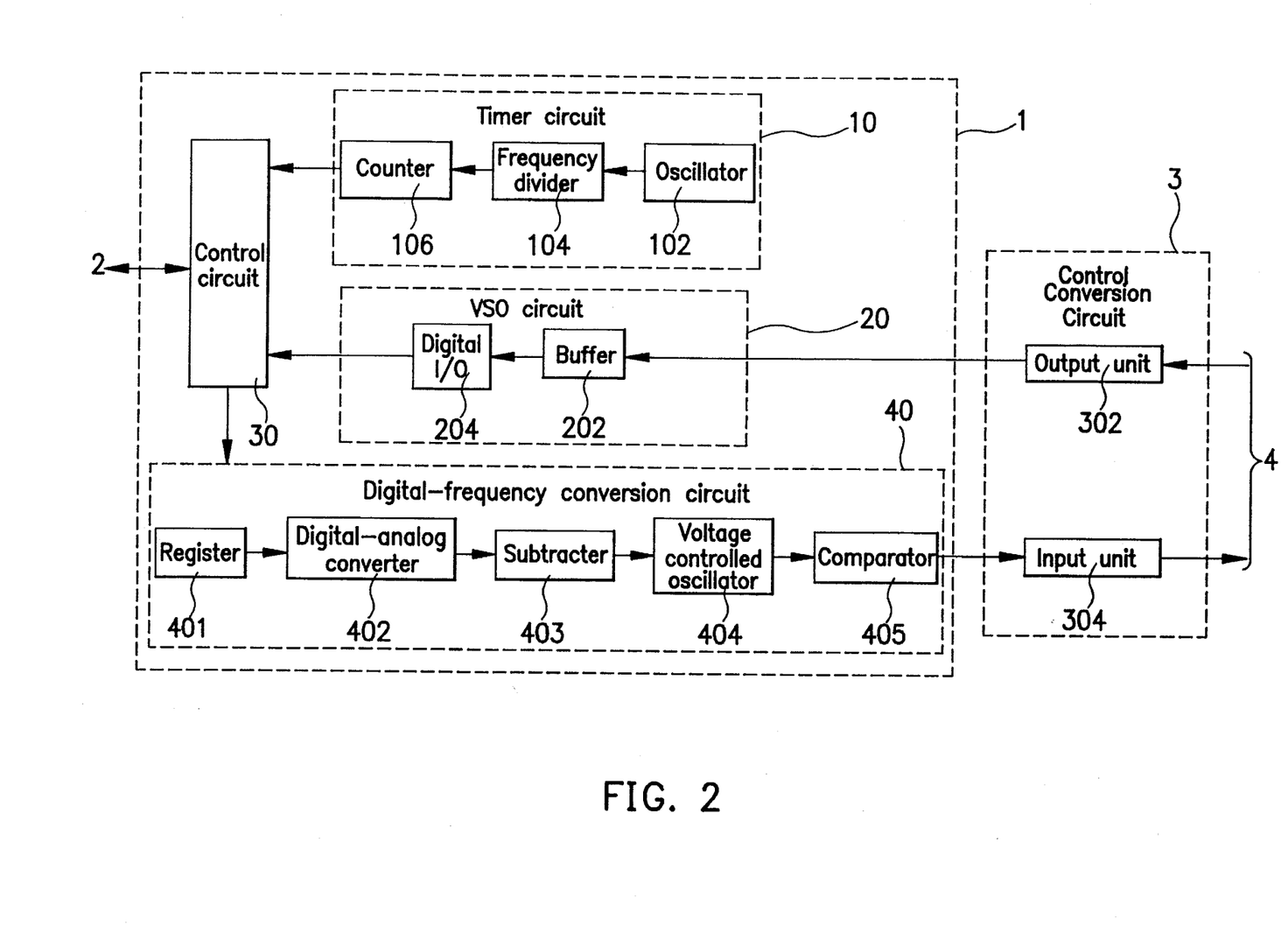
FIG. 2 is a block diagram showing the construction of the circuit of the real-time simulation system according to this invention.

As shown in FIG. 2, the simulation system 1 according to this invention includes a timer circuit 10, a valve signal output (VSO) circuit 20, a control circuit 30 and a digital-analog conversion circuit 40.

The timer circuit 10 sends time pulses to the control circuit 30. Since the frequencies of the timers installed in different computers are not all the same, the timer circuit 10 is designed to include an oscillator 102, a frequency divider 104 and a counter 106. For example, an 8 MHz pulse generated by the oscillator 102 is converted into a 2 MHz pulse by the frequency divider 104 and transmitted to the counter 106 so as to comply with the requirement of an accuracy within 0.5 μs.

The VSO circuit 20 is coupled to the controller conversion circuit 3 so as to send control signals received from the ABS controller 4 to the control circuit 30. The VSO circuit 20 may be composed of a buffer 202 and a digital I/O 204. The control signals generated by the ABS controller 4 are output by way of the buffer 202 and the digital I/O 204. The control signals of the oil valve of the ABS controller 4 must clearly represent three modes (i.e. increasing the pressure, decreasing the pressure, and holding the pressure). Thus, two bits per wheel are enough to represent the current mode of each wheel.

The control circuit 30 is coupled to the computer 2, the timer circuit 10 and the VSO circuit 20, for receiving time pulses and control signals and sending them to the computer 2. Signals output from the control circuit 30 are calculated, analyzed and displayed by the computer 2. At the same time, the computer 2 transmits car dynamic data to the control circuit 30 which subsequently sends the data to the digital-analog conversion circuit 40. The control circuit 30 comprises a DIP switch, a logical circuit and a decoder, for processing the data bus and controlling the address and the buses of the computer 2.

The digital-analog conversion circuit 40 is coupled to the control circuit 30 and the controller conversion circuit 3, for converting the car dynamic data output from the computer 2 and transmitting the data to the ABS controller 4 through the controller conversion circuit 3. The digital-analog conversion circuit 40 may be composed of a register 401, a digital-analog converter 402, a subtracter 403, a voltage controlled oscillator 404 and a comparator 405. The car dynamic data output by the control circuit 30 are sent to the register 401 and converted into analog voltage signals by the converter 402 which then are converted into a predetermined range by the subtracter 403 and sent to the voltage controlled oscillator 404. The voltage controlled oscillator 404 converts the voltage signals into frequency signals. Subsequently, the comparator 405 converts the frequency signals into square-wave signals.

Since the specifications of different controllers manufactured by different companies are not comparable with each other, signals generated by the ABS controller 4 have to be converted into a certain form adaptable for the real time simulation system 1 of this invention. The controller conversion circuit 3 is composed of an output unit 302 and an input unit 304. In the output unit 302, a comparator converts the control signals of the oil valve (for example, 24 V stands for increasing the pressure, 12 V stands for holding the pressure and 0 V stands for decreasing the pressure) into digital signals (for example, 00B stands for increasing the pressure, 01B stands for holding the pressure and 11B stands for decreasing the pressure). In the input unit 304, a difference amplifier adjusts the amplitudes of the square-wave signals coming from the digital-analog conversion circuit 40 to suitable values (for example, into the range of −2.5 V to 2.5 V) so as to be comparable with the ABS controller 4. In other words, the square-wave signals are converted into wheel speed signals acceptable to the ABS controller 4.

Figure 3:
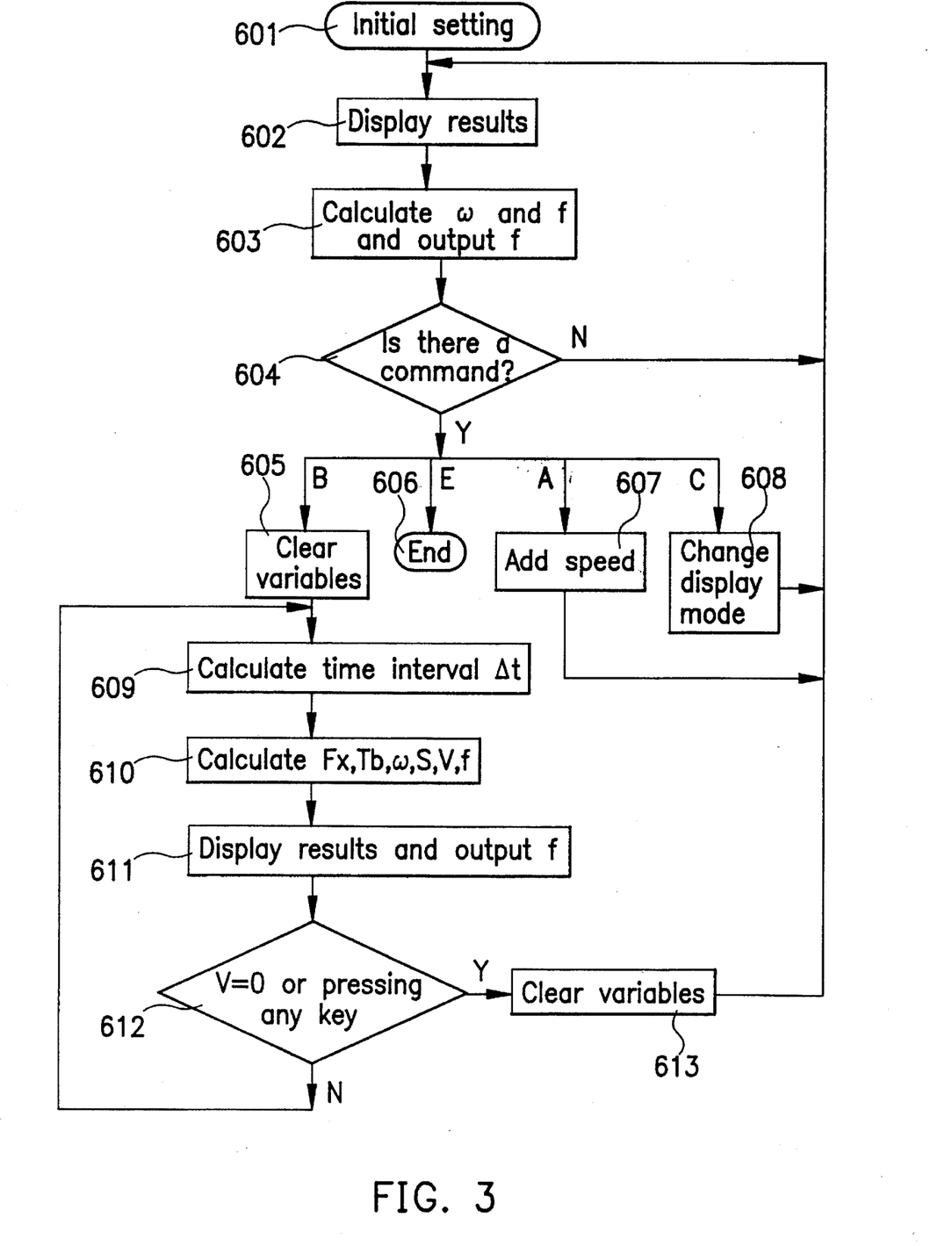
FIG. 3 is a flowchart showing the simulation program stored in a computer.

FIG. 3 is a flowchart showing the simulation program stored in the computer 2. As shown in FIG. 3, at step 601, the simulation system is initiated. At step 602, the results are displayed on the monitor of the computer 2. At step 603, the angular velocity of the wheel ω and the frequency of square pulses f are calculated. At step 604, if there is a command, the process goes optionally to step 605 at which the variables are cleared and the process goes to step 609, or to step 606 at which the process is ended, or to step 607 at which velocity of the wheel and the process goes back to step 602, or to step 608 at which the screen of the monitor is changed. If no command is found, the process goes to step 602. At step 609, the time interval Δt is calculated. At step 610, the brake forces Fx, brake torque Tb, angular velocity of the wheels ω, slip S, car speed V, and the frequency of square pulses f are calculated. At step 611, the results of the calculation are displayed and the frequency of square pulses f is output. At step 612, if V is set to a zero value or if any key is pressed, the process goes to step 613. Otherwise, the process goes to step 609. At step 613, variables are cleared and the process goes to step 602.

Figure 4A:
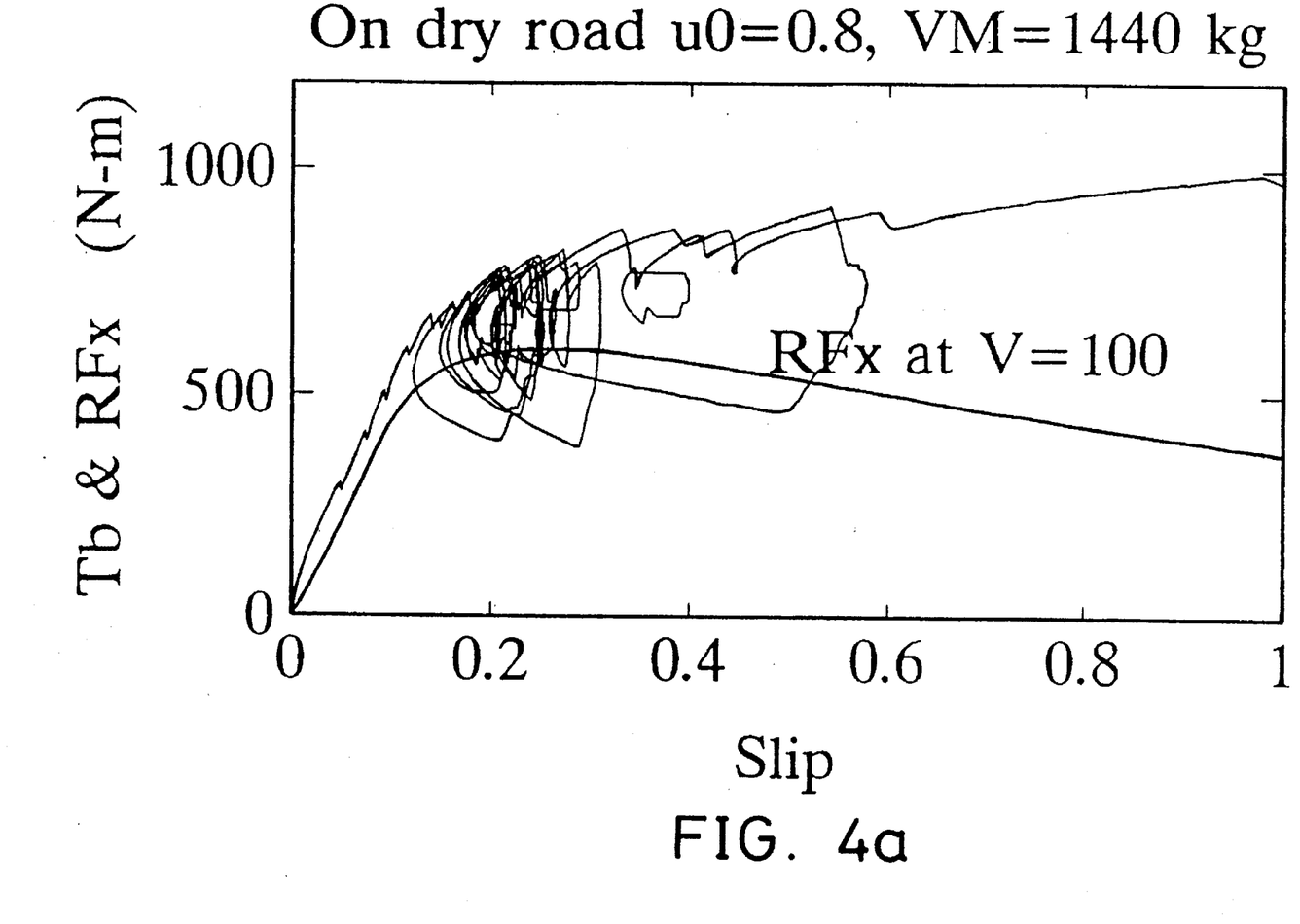
FIGS. 4(a), 4(b) and 4(c) are diagrams showing the simulation results of a car weighing 1440 kilograms, equipped with an ABS controller manufactured by the BOSCH company, on dry, wet and icy roads, respectively.
Figure 4B:
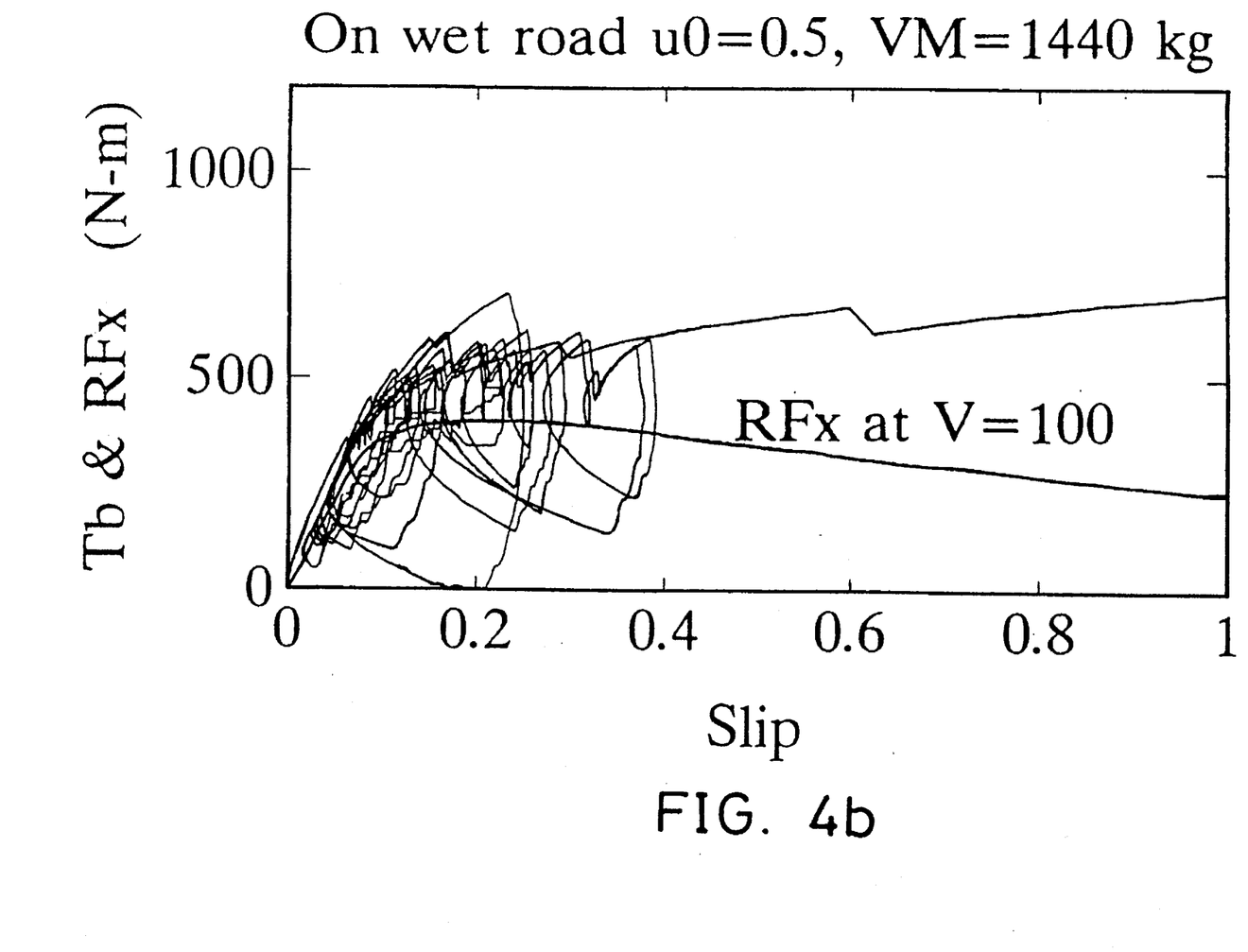
Figure 4C:
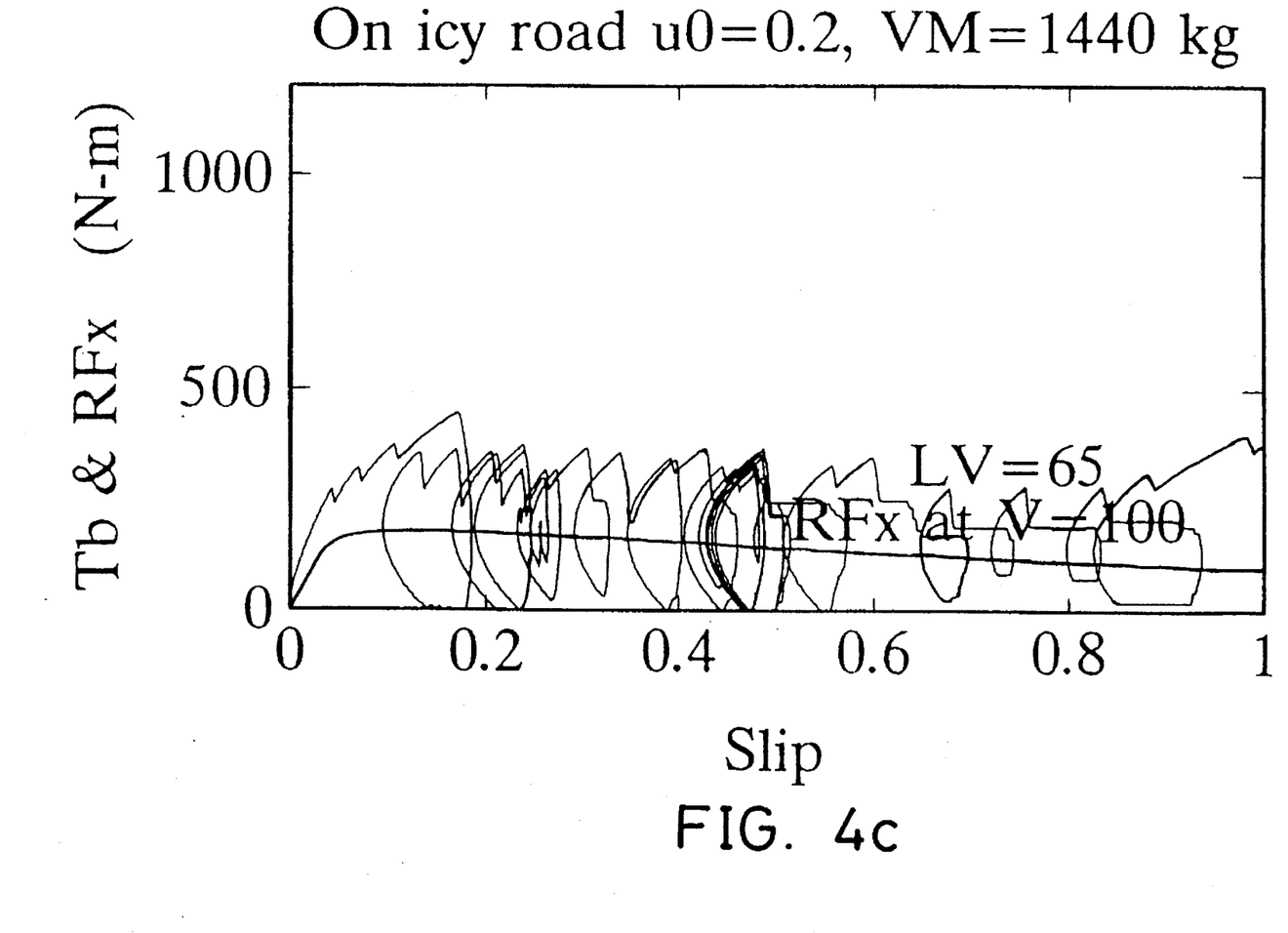
Figure 5A:
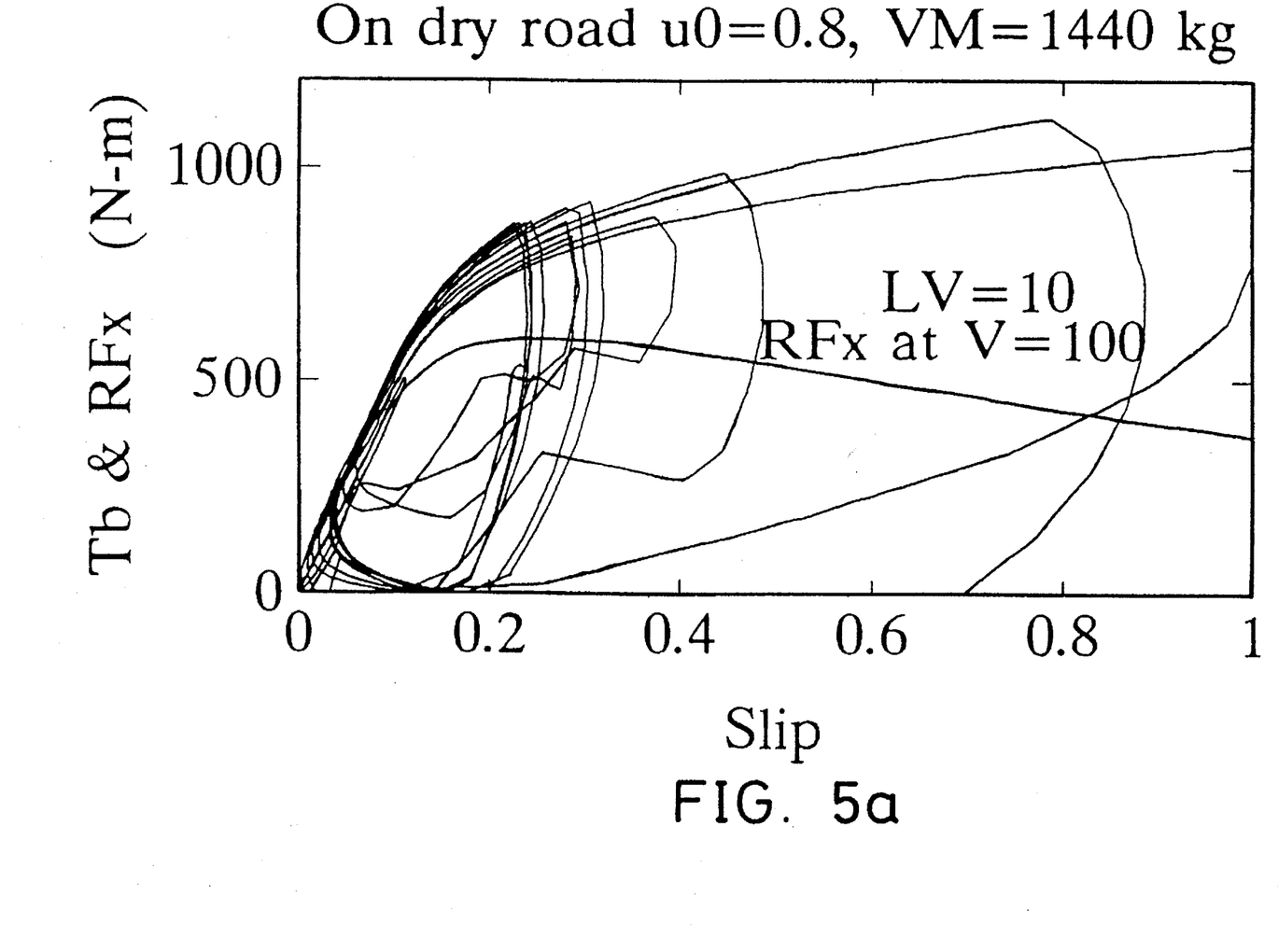
FIGS. 5(a), 5(b) and 5(c) are diagrams showing the simulation results of a car weighing 1440 kilograms, equipped with an ABS controller working under a fuzzy control rule, on dry, wet and icy roads, respectively.
Figure 5B:
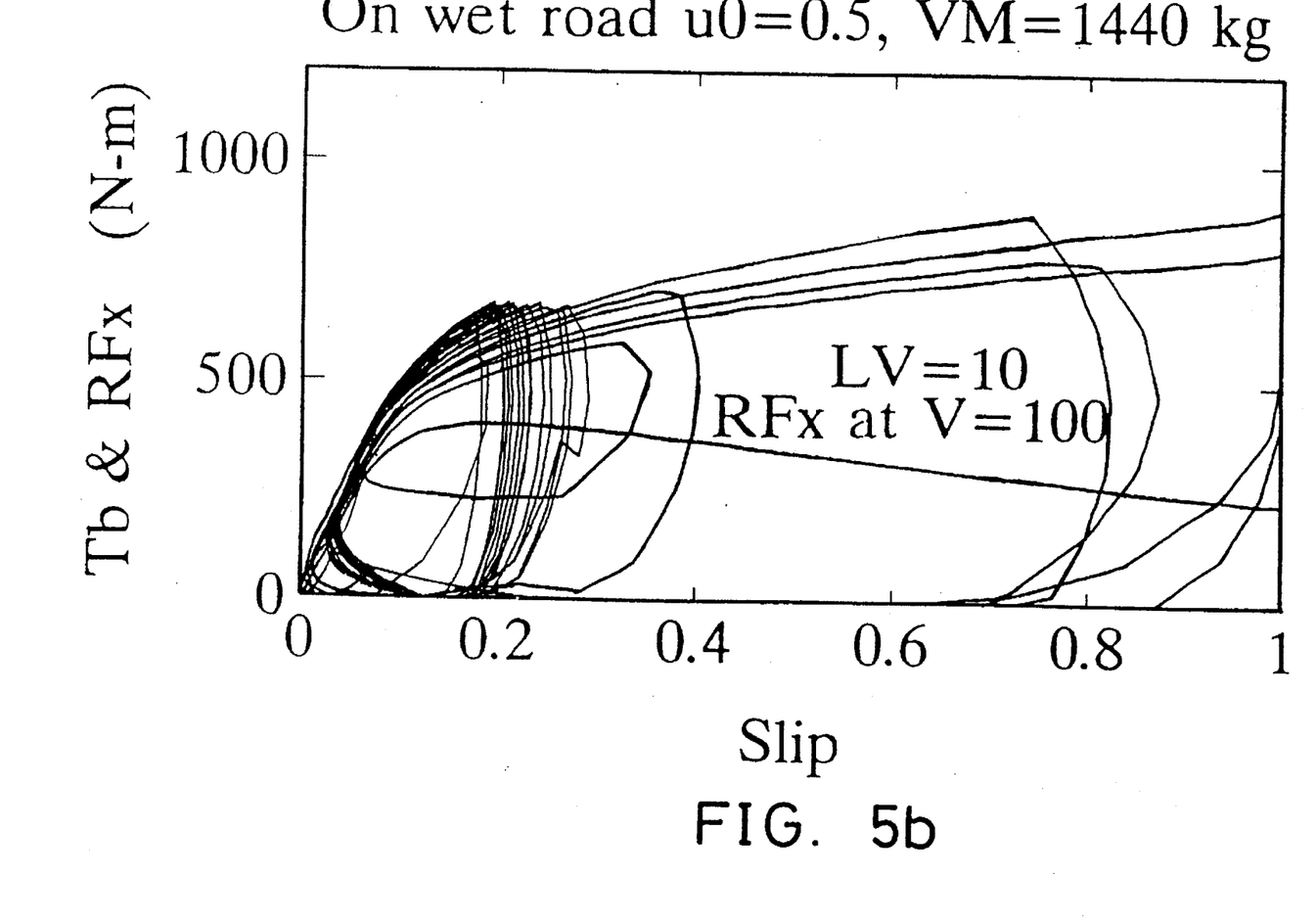
Figure 5C:
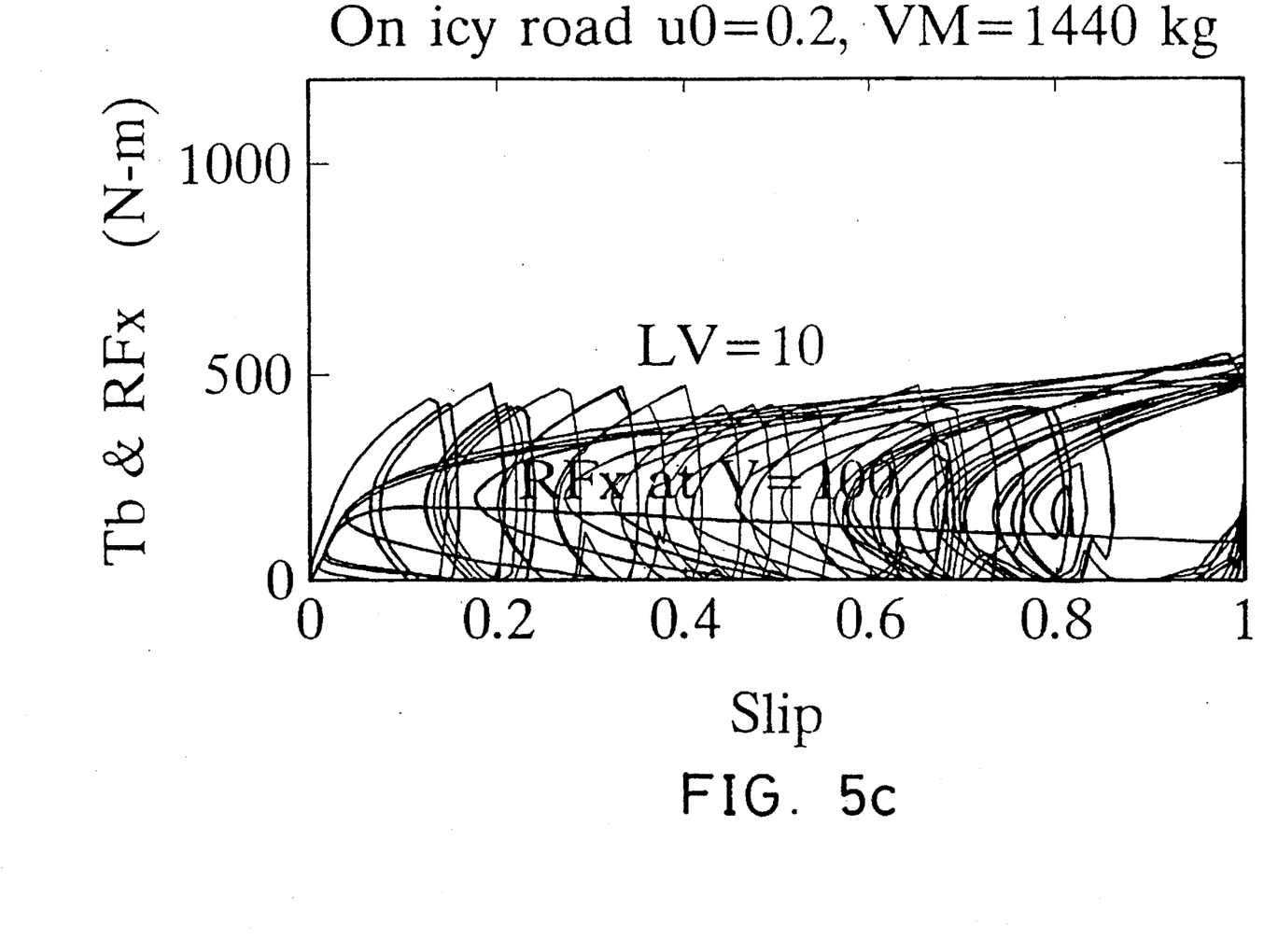
Figure 6A:
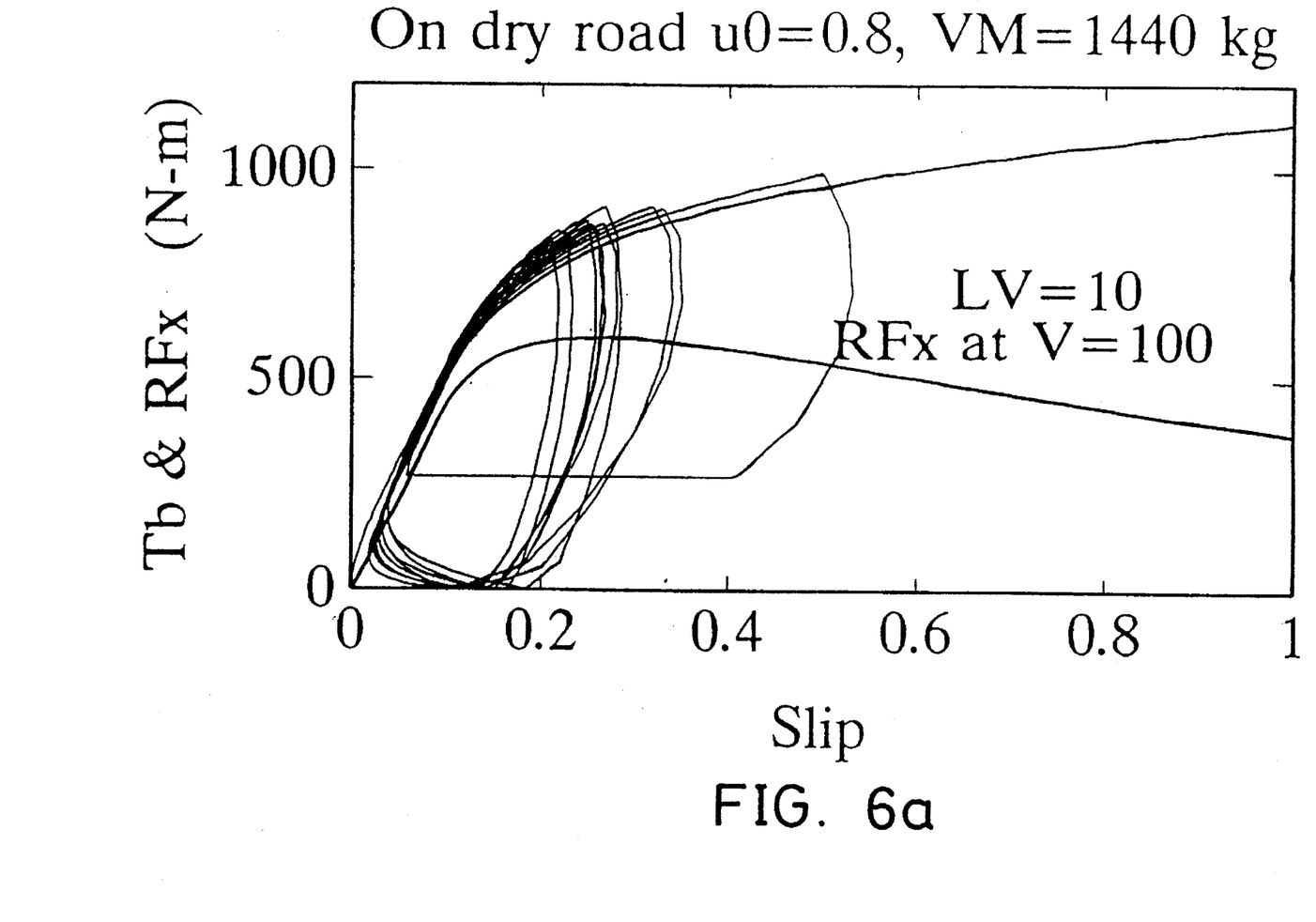
FIGS. 6(a), 6(b) and 6(c) are diagrams showing the simulation results of a car weighing 1440 kilograms, equipped with an ABS controller working under a PIR3 control rule, on dry, wet and icy roads, respectively.
Figure 6B:
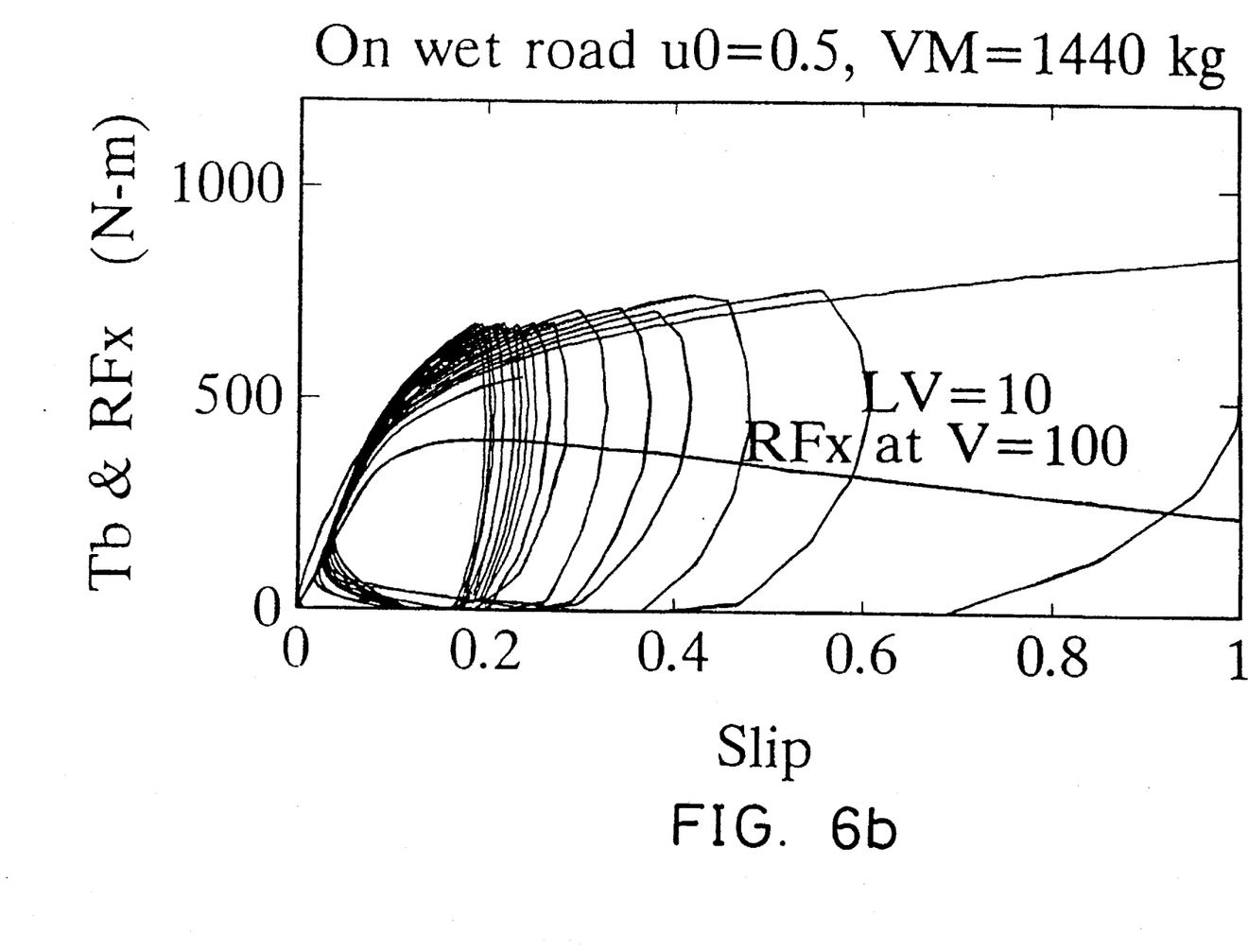
Figure 6C:
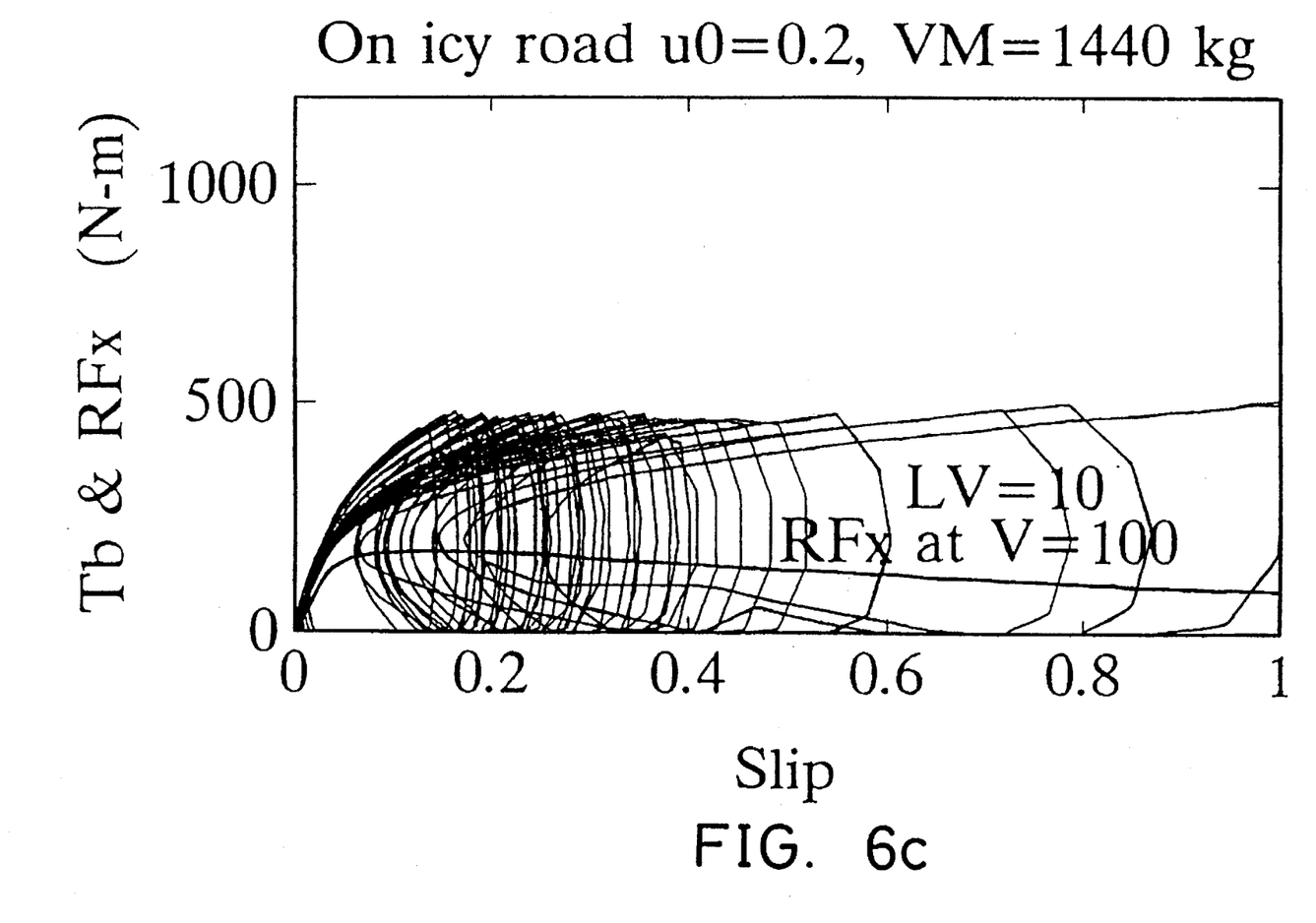

FIGS. 4(a), 4(b) and 4(c) are diagrams showing the simulation results of a car weighing 1440 kilograms, equipped with an ABS controller manufactured by the BOSCH company, on dry, wet and icy roads, respectively. FIGS. 5(a), 5(b) and 5(c) are diagrams showing the simulation results of a car weighing 1440 kilograms, equipped with an ABS controller working under a fuzzy control rule, on dry, wet and icy roads, respectively. FIGS. 6(a), 6(b) and 6(c) are diagrams showing the simulation results of a car weighing 1440 kilograms, equipped with an ABS controller working under a PIR3 control rule, on dry, wet and icy roads, respectively. The RFx (ordinate) in FIGS. 4(a) to 6(c) represents the friction force induced between the car wheels and the road when the car is at a speed of 100 km/hr, and the abscissa represents slip during braking, which is defined as:

$$\text{slip} = 1 - (R * \omega_k)/V$$

Wherein, $\omega_k$ is the angular speed of the car wheel, R is the radius of the car wheel, and V is the car speed.

It is found that the friction force RFx has its maximum value when the value of slip is near 0.2. If a brake-pedal in a system without an ABS controller is fully depressed, locking of the car wheels will occur, and, under this situation, the value of slip is 1. The diagrams of FIGS. 4(a) to 6(c) show that locking of car wheels will not produce maximum frictional force (due to the fact that the braking torque is larger than the frictional torque provided by the road). In addition, the frictional forces induced between each of the car wheels and the road are not equal to one another. Thus, skidding or spinning will occur. Therefore, a good ABS controller is capable of maintaining an appropriate balance between braking torque Tb and the friction torque supplied by the road. In FIGS. 4(a) to 6(c), the loops in the running curves show that braking torque Tb was adjusted by the ABS controller 4 at all times through the solenoid oil valves. It should be noted that a good ABS controller produces small loops situated near the maximum value of RFx since this represents a situation wherein the braking torque Tb is maintained close to maximum value of RFx. In other words, the closer to the maximum value of RFx the loops (representing Tb) are, the better the ABS controller is. Comparing FIGS. 4(a) to 6(c) with one another, it is found that the BOSCH ABS controller is better than the other two under general situations except on icy roads (on icy roads, locking of the car wheels occurred when the car equipped with the BOSCH ABS controller was travelling at a speed over 65 km/hr). From the above diagrams, it is clear that the real-time simulation system of this invention can be used to illustrate the performance of ABS controllers.

As described above, an ABS controller can be tested in a hardware-in-the-loop fashion which is inexpensive and efficient and with test results which are close to the real situation. Furthermore, the test results can be recorded and displayed on a monitor. Furthermore, unlike actual tests on roads, testing according to the present invention involves no risk or danger during testing. During maintenance, the simulation system can easily detect the real problem with an ABS controller and display it on a monitor, while traditional maintenance devices can only supply error codes to the maintenance engineer. In addition, employing the real-time simulation system of this invention, the principles of the ABS can be demonstrated by means of animated pictures on the monitor of a computer. This will enable students to understand these principals easily.

Although this invention has been described in its preferred form with a certain degree of particularity, it is understood that the present disclosure of the preferred form can be changed in the details of construction and the combination and arrangement of parts may be varied without departing from the spirit and the scope of the invention as hereinafter claimed.

What is claimed is:

1. A real-time simulation system for testing an ABS controller, which receives simulated car dynamic data from a computer and transmits the simulated car dynamic data to the ABS controller through a controller conversion circuit, and in return receives control signals from the ABS controller and feeds the control signals back to the computer through the controller conversion circuit, for calculating, analyzing and displaying simulated test results of the ABS controller on a monitor of the computer, comprising:

a timer circuit for outputting time pulses;

a valve signal output circuit coupled to the controller conversion circuit, for outputting control signals coming from the ABS controller;

a control circuit coupled respectively to the computer, the timer circuit, and the valve signal output circuit, for receiving simulated car dynamic data from the computer, transmitting the simulated car dynamic data to the ABS controller, receiving the time pulses coming from the timer circuit and the control signals coming from the ABS controller, and transmitting the time pulses and the control signals to the computer for calculating and analyzing a simulated friction force and slip between a wheel and a road surface based on the time pulses and the control signals and displaying the simulated test results based on the analysis of said simulated friction force and slip on the monitor of the computer; and a digital-to-analog conversion circuit coupled to the control circuit and the controller conversion circuit, for converting the simulated car dynamic data coming from the control circuit and sending the converted data to the ABS controller.

* * * * *

UNITED STATES PATENT AND TRADEMARK OFFICE
CERTIFICATE OF CORRECTION

PATENT NO.     : 5,557,523
DATED          : September 17, 1996
INVENTOR(S)    : Edge C. YEH et al.

It is certified that error appears in the above-identified patent and that said Letters Patent is hereby corrected as shown below:

On the cover page, Item [54], the title, "REAL-TIME SIMULATION FOR TESTING AN ABS CONTROLLER" should read --REAL-TIME SIMULATION SYSTEM FOR TESTING AN ABS CONTROLLER--.

Signed and Sealed this

Fourth Day of November, 1997

*Attest:*

BRUCE LEHMAN

*Attesting Officer*    *Commissioner of Patents and Trademarks*